UNITED STATES PATENT OFFICE.

HERMAN ELISHA BROWN, OF COLDWATER, MICHIGAN.

PROCESS OF MAKING DOLOMITIC SANDSTONE.

SPECIFICATION forming part of Letters Patent No. 697,319, dated April 8, 1902.

Application filed June 19, 1901. Serial No. 65,133. (No specimens.)

*To all whom it may concern:*

Be it known that I, HERMAN ELISHA BROWN, a citizen of the United States, and a resident of Coldwater, in the county of Branch and State of Michigan, have invented a new and Improved Process of Making Dolomitic Sandstone, of which the following is a full, clear, and exact description.

The object of my invention is to produce a compact artificial stone; and the invention consists in the selection and preparation of materials used in the process of manufacturing and the composition or product of such a process hereinafter described.

The sandstone produced by the union of the oxids of calcium and magnesium with the various compounds of silica is of fine and compact structure, so that it can be used for all ordinary purposes of construction, as well as the finer decorative purposes, and has great tensile and crushing strength. By its composition and its structure the stone is able to resist the disintegrating actions of the weather as well as those of water.

The details of my process are as follows: My dolomitic sandstone is manufactured, first, by calcining the dolomite, which consists of calcium carbonate, about fifty-six parts, and magnesium carbonate, about forty-four parts. This composition may differ in different dolomites. Also the dolomite may contain other accompanying compounds in small proportions. After calcining the dolomite it is completely hydrated, thus—by adding the requisite amount of water, which is governed by the chemical composition of the particular dolomite used—forming the hydroxids of the alkaline earths contained in the dolomite. The hydration of the entire mass of the calcined dolomite is exceedingly important, for if there are any unhydrated particles in the sandstone the hydration due to the action of the moisture in the atmosphere or elsewhere will slowly take place in the finished stone even after the lapse of months and produce checks and cracks, which accompany the expansion of the said chemicals as they unite.

In order that the calcined dolomite may be completely hydrated, the requisite amount of water for hydration, together with the calcined dolomite, is placed in the inner compartment of a double container or receptacle of any well-known pattern. The containers should be of such a structure as to hold steam at high pressure, so that the mixture of water and calcined dolomite may be thoroughly heated without any contact with condensed water produced from the steam. High-pressure steam is then directed into the outer container and thoroughly heats the inner receptacle with its contents for a sufficient time to bring about a complete hydration of the alkaline earths. The length of time which the oxids should be heated depends upon the chemical composition of the dolomite and the density of the calcined earths.

Another method may be used for hydrating the calcined dolomite by placing the requisite amount of water to bring about a complete hydration of the oxids in a tightly-closed receptacle which has appropriate means for intimately mixing the water and the calcined dolomite. Upon mixing by such appropriate means steam will be produced by the heat rising from the chemical action of the water and the caustic oxids, which will produce a sufficient pressure to completely hydrate the earths in the receptacle. After the hydration of the basic oxids of dolomite the hydrated mass is mixed with some one or more of the compounds of silica and sufficient water to permit of molding, stamping, and pressing the resultant mixture.

The various compounds of silica which are suitable for the manufacture of dolomitic sandstone may be sand, silicious earths, or prepared combinations of silica. If the silica selected is in a crystalline or coarse condition, it should be broken and crushed to a suitable degree of fineness to give a uniform texture to the resultant stone. It should be ground sufficiently fine so that about ninety-five per cent. passes through a No. 100 sieve and about seventy per cent. passes through a No. 200 sieve. This fineness should be of such a degree that there will be a chemical combination of the silica with the bases which are used in the manufacture of the stone. The materials thus prepared are mixed in the following proportions: five to thirty-five per cent. of the hydrated calcined dolomite with sixty-five to ninety-five per cent. of one or more of the various forms of silica, a portion or all of which shall have been ground to the above-mentioned degree of fineness, the amount of the finely-ground material to be dependent upon the texture, strength, and finish required in the dolomitic sandstone. To this mixture is added sufficient water to render the mixture plastic and compressible and to allow the cementing hydrated earths to surround the silicious particles. The constituents are then thoroughly and quickly mixed with suitable mixing apparatus and the resultant composition placed in molds to be pressed and stamped by suitable machines. The molded mass, either with or without the mold, is then subjected to the curing or hardening process, which causes a chemical action to take place by means of the combined agencies of moisture, pressure, and the carbon dioxid in the atmosphere and water-vapor surrounding the mass. The hardening process consists in subjecting the molded forms to the action of steam, the pressure of which is gradually raised until the desired chemical action is brought about. The molded forms are allowed to remain in the steam until they obtain sufficient strength to answer the requirements for the desired building purposes.

Having thus described my invention, I claim as new and desire to secure by Letters Patent—

1. The process of making dolomitic sandstone, consisting in calcining the alkaline earths contained in dolomite, hydrating the calcined product, mixing with silicious combinations, and molding and heating the mixture.

2. The process of making sandstone, consisting in calcining dolomite, hydrating the same, and chemically combining the composition with silica.

3. The process of making dolomite sandstone, consisting in calcining alkaline earths of dolomite, adding water sufficient to form hydroxids of the said earths, adding finally, ground, or a mixture of ground and unground, compounds of silica, and curing the resultant composition.

4. The process of making artificial sandstone, consisting in subjecting silicious earths to the chemical action of the hydrated alkaline earths of dolomite.

5. The process of making artificial stone, consisting in calcining dolomite, adding sufficient water to form hydroxids, adding silicious compounds, mixing the composition with water, and molding and curing the resultant mixture.

6. A dolomitic sandstone, consisting of five to thirty-five per cent. of hydrated calcined dolomite and sixty-five to ninety-five per cent. of one or more of the various forms of silica.

7. A dolomitic sandstone, consisting of five to thirty-five per cent. of hydrated magnesium and calcium oxids, and sixty-five to ninety-five per cent. of combinations of silica.

8. A sandstone, consisting of five to thirty-five per cent. of calcium and magnesium hydroxids and sixty-five to ninety-five per cent. of silicious compounds.

9. An improvement in the art of making artificial stone, which consists in calcining dolomite by heating the same to drive off the carbon dioxid and other gases normally combined therewith, subjecting the resulting calcined substance to which the required amount of water has been added to the action of steam under pressure for the purpose of hydrating the same, next mixing the hydrated compound with a comminuted silicious substance, for the purpose of forming silicates, and finally subjecting the compounds to the action of steam and accompanying carbon dioxid, for the purpose of forming carbonates in addition to said silicates.

10. An improvement in the art of making artificial stone, which consists in removing from native dolomite the carbon dioxid and water normally combined therewith, subjecting the resulting calcined substance to the action of aqueous vapor for the purpose of hydrating the same, mixing the hydrate thus formed with a silicious substance for the purpose of forming silicates, and then subjecting the mass to the action of carbon dioxid for the purpose of forming carbonates in addition to said silicates.

11. An improvement in the art of making artificial stone, which consists in calcining dolomite, hydrating the resulting substance by a distinct step and subjecting the hydrate thus formed to the independent successive action of silicates and of carbon dioxid, thus forming both silicates and carbonates.

12. An improvement in the art of making artificial stone, which consists in calcining dolomite, applying steam to the resulting substance, thus forming a hydrate, treating the hydrate thus formed with silicious substance, thus forming silicates, and subjecting the entire mass to a mixture of steam and carbon dioxid, thus forming both carbonates and silicates.

In testimony whereof I have signed my name to this specification in the presence of two subscribing witnesses.

HERMAN ELISHA BROWN.

Witnesses:
 FRANK I. POST,
 LA VERNE W. SPRING.